United States Patent [19]

Shreve

[11] 4,235,516

[45] Nov. 25, 1980

[54] COMPLEX SPATIAL MODULATOR

[75] Inventor: James S. Shreve, Fairfax, Va.

[73] Assignee: The United States of America as represented by the Secretary of the Army, Washington, D.C.

[21] Appl. No.: 19,032

[22] Filed: Mar. 9, 1979

[51] Int. Cl.³ .............................................. G02F 1/03
[52] U.S. Cl. ................................................... 350/150
[58] Field of Search ........................................ 350/150

[56] References Cited

U.S. PATENT DOCUMENTS

| | | | |
|---|---|---|---|
| 3,313,938 | 4/1967 | Peters | 350/150 |
| 3,517,206 | 6/1970 | Oliver | 250/225 |

Primary Examiner—Richard A. Rosenberger
Attorney, Agent, or Firm—Nathan Edelberg; Robert P. Gibson; Saul Elbaum

[57] ABSTRACT

An apparatus for effecting independent spatial amplitude and phase modulation of a light beam. Two birefringent crystal modulation means such as PROM's (Pockel's Readout Optical Modulator) are arranged so that the first modulation means spatially modulates the amplitude of the beam in accordance with an input image applied to the first modulation means while the second modulation means spatially modulates the phase of the beam in accordance with an input image which is applied to the second modulation means.

7 Claims, 3 Drawing Figures

COMPLEX SPATIAL MODULATOR

RIGHTS OF THE GOVERNMENT

The invention described herein may be manufactured, used, and licensed by or for the United States Government for governmental purposes without the payment to us of any royalty thereon.

The present invention is directed to an apparatus for independently but simultaneously effecting amplitude and phase spatial modulation of a coherent light beam.

As is known, the art of coherent optical processing has increased in technological importance in recent years. In coherent optical processing, it is frequently desirable to spatially control each of such modulations independently. No device exists in the prior art for effecting such independent, simultaneous modulation of both the amplitude and phase.

It is therefore an object of the invention to provide an apparatus for independently spatially modulating the amplitude and phase of a light beam.

It is further object of the invention to provide a compact, rugged, dust-free device for performing such spatial modulation.

The above objects are accomplished by providing first and second birefringent crystal modulation means which spatially modulate the beams inputted thereto in accordance with a desired image applied to each means. The respective crystal means are positioned with their slow and fast axes oriented with respect to the respective planes of polarization of the respective beams inputted thereto so that the first modulation means spatially modulates the amplitude of the beam inputted thereto and the second modulation means modulates the phase of the beam inputted thereto, which is the beam outputted from the first modulation means. Thus, the amplitude and phase modulation can be controlled independently by changing the images respectively applied to the first and second modulation means.

The invention will be better understood by referring to the accompanying drawings, in which FIG. 1 is a diagram which illustrates the principle of the invention as well as a first embodiment thereof.

Figure 1:
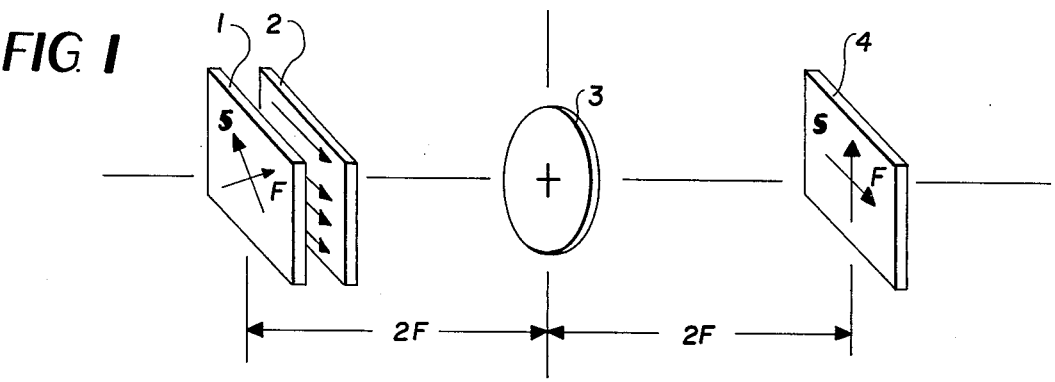

Referring to FIG. 1, element 1 is a birefringent crystal modulation means which spatially modulates coherent light passing through it in accordance with a desired image applied to the modulation means. While any such birefringent crystal modulation means may be used, in the preferred embodiment, a PROM (Pockel's Readout Optical Modulator), such as is sold by the Itek Corporation is used. Such a device is completely described in U.S. Pat. No. 3,517,206, which is incorporated by reference in the present disclosure.

The PROM device disclosed in U.S. Pat. No. 3,517,206 is comprised of a birefringent crystal juxtaposed with a photoelectret. The photoelectret retains an electric field which spatially varies in magnitude across the electret in accordance with an image which is applied to the electret. These spatial variations in electric field magnitude are applied to the birefringent crystal. When plane polarized coherent light beam of a wavelength to which the device is transparent is passed through the device, it is converted to elliptically polarized light by the birefringent crystal. The degree of birefringence of the crystal and therefore the eccentricity of the elliptically polarized light spatially varies across the crystal in dependence on the intensity of the electric field applied by the photoelectret. An analyzer is used to convert the spatial variations in elliptical eccentricity to spatial variations in amplitude.

Referring again to FIG. 1, 1 and 2 represent the PROM and analyzer used for spatial amplitude modulation as known in the prior art, and as described above. Coherent light which is vertically polarized is passed through PROM 1, which is oriented with its slow and fast axes as shown. Since the vertically polarized light has a component which lies along each of the slow and fast axes, the light exiting from crystal device 1 is elliptically polarized, and as explained above and in U.S. Pat. No. 3,517,206, the degree of eccentricity of the elliptical polarization varies spatially in accordance with the modulation image applied to the device. Analyzer 2, which has a horizontal plane of polarization, converts the spatial variation in eccentricity to spatial intensity variation in the plane polarized light which is outputted therefrom.

Lens 3, which is located at a distance of twice the focal length from PROM 1 and PROM 4, focusses the amplitude modulated light on PROM 4. This PROM is oriented so that one of its slow and fast axes is parallel to the horizontal plane of polarization of the light outputted from analyzer 2.

As in the case of PROM 1, the degree of birefringence of PROM 4 spatially varies in accordance with the image applied to the device. However, since the coherent light passed through the device has a polarization component in the direction of only one of the axes of the crystal, this change in birefringence merely causes a spatial variation in the phase of the plane polarized beam due to spatial variation in index of refraction, but does not result in an elliptically polarized beam as in the case of PROM 1. Therefore, PROM 4 modulates the phase of the beam in accordance with the applied image. Since the images applied to PROM's 1 and 4 may be controlled independently, the apparatus of the invention effects independent modulation of the amplitude and phase of the beam.

Figure 2:
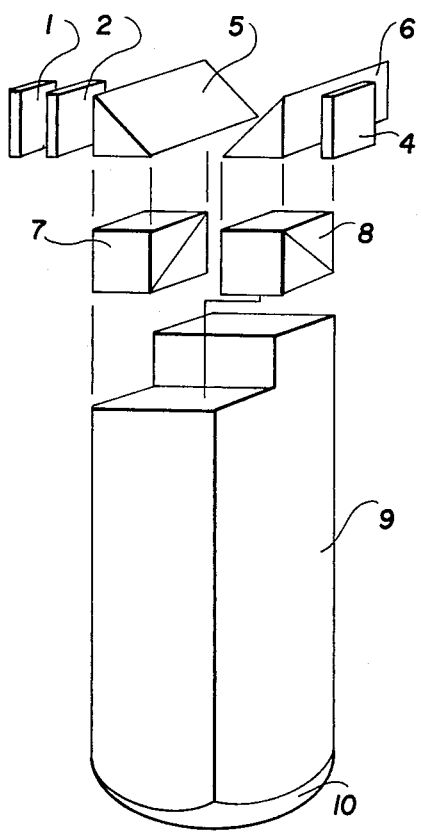
FIG. 2 is an exploded view of the preferred embodiment of the invention.

Referring to FIG. 2, in the preferred embodiment of the invention, the optical path is constrained to lie within a solid transparent medium. This embodiment results in a more rugged device, and one that can be made free of, and will remain free of, contaminants such as dust. For ease of construction, the device is constructed of various transparent elements (1,2,5,7,9,8,6,4) cemented together, and in fact even the body 9 could be assembled from a number of more basic shapes.

In the preferred embodiment, the lens 3 (shown in FIG. 1) is replaced by the curved reflective surface 10 of the transparent body 9. By virtue of its curvature, it focusses an image of PROM 1 upon PROM 4. The PROM's 1 and 4 and the analyzer 2 are oriented as in FIG. 1. Prism 5 directs the light from analyzer 2 down towards the reflective surface 10, while prism 6 directs the light from the reflective surface 10 to the PROM 4. Beamsplitters 7 and 8 permit modulation images to be input into the PROM's.

Figure 3:
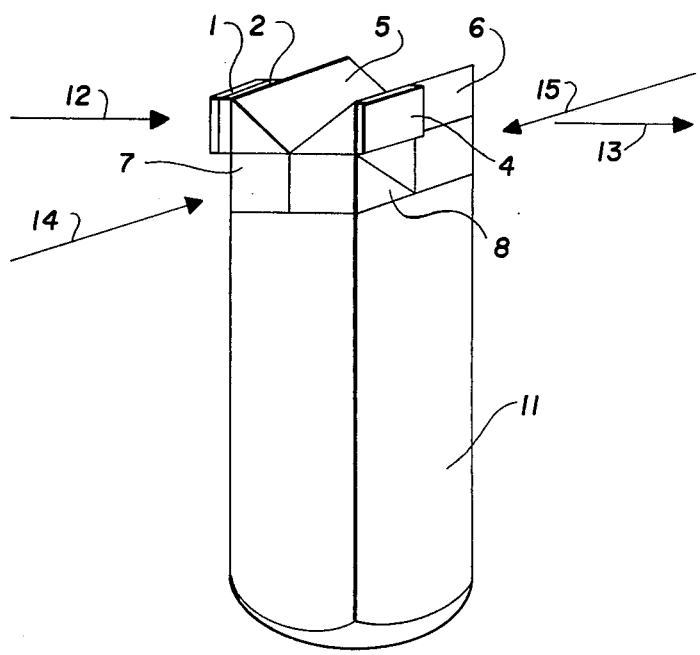
FIG. 3 is a view of the preferred embodiment in assembled form and also illustrates the operation of this embodiment.

Referring to FIG. 3, representative light rays 14 and 15 displaying the desired input distributions (the modulation images) are directed within the interface 11 by the beamsplitters and prisms to the PROM's. Although in each case the input information is conveyed by amplitude variations, in one case these variations affect the amplitude of the controlled light while in the other case they control the phase. The light to be thus controlled by the amplitude and phase modulations is made incident upon the interface 11 as shown by the representative ray 12. It emerges from the interface as shown by the representative ray 13.

I wish it to be understood that I do not desire to be limited to the exact details of construction shown and described, for obvious modifications can be made by a person skilled in the art.

What is claimed is:

1. An apparatus for effecting both amplitude and phase spatial modulation of a coherent light beam, comprising, a first birefringent crystal modulation means for accepting a coherent input light beam which is plane polarized in a first direction and providing an output light beam which is spatially amplitude modulated in accordance with a desired first image which is applied to said modulation means and which is plane polarized in a second direction, said birefringent crystal modulation means including a birefringent crystal means for changing its degree of birefringence in accordance with said first applied image, said birefringent crystal means being oriented so that said first direction is between the slow and fast axes of the crystal means, means for focusing said spatially amplitude modulated beam onto a second birefringent crystal modulation means, said second birefringent crystal modulation means including a birefringent crystal means for changing its degree of birefringence in accordance with a second image which is applied to said second modulation means, said second crystal means being oriented with one of its slow and fast axes parallel to said second direction so that the phase of said spatially amplitude modulated beam is spatially modulated, a solid, transparent medium interposed between said first and second modulation means, and means to constrain the optical path of said coherent light beam to lie within said medium, whereby said apparatus assures a contaminant-free path for said light beam and the amplitude and phase of said coherent light beam are both modulated by said apparatus.

2. The apparatus of claim 1 wherein said first birefringent crystal modulation means includes an analyzer having a plane of polarization in said second direction.

3. The apparatus of claim 2 wherein each of said birefringent crystal means comprises a birefringent crystal juxtaposed with a photo-electret.

4. The apparatus of claim 3 wherein each of said birefringent crystal means includes a Pockel's device.

5. Apparatus as in claim 1, wherein said means for focusing said beam onto said second modulation means comprises a portion of said solid medium.

6. Apparatus as in claim 5, wherein said means for focusing said beam onto said second modulation means comprises a curved reflecting surface formed as part of said solid medium.

7. Apparatus as in claim 1, wherein said first and second modulation means, said means for focusing the beam on the second modulation means, and said solid medium are all formed as a single composite unitary structure, thereby comprising a compact, rugged and dust free modulation device capable of both amplitude and phase spatial modulation of coherent light.

* * * * *